United States Patent [19]

Hosouchi et al.

[11] Patent Number: 5,579,507
[45] Date of Patent: Nov. 26, 1996

[54] DATA TRANSFER CONTROL OF VIRTUAL STORAGE SUPPORTED BY THREE-LEVEL HIERARCHICAL STORAGE

[75] Inventors: Masaaki Hosouchi, Yokohama; Hisashi Katada, Yamanashi-ken; Toshiaki Arai, Sagamihara, all of Japan

[73] Assignee: Hitachi, Ltd., Tokyo, Japan

[21] Appl. No.: 102,645

[22] Filed: Aug. 5, 1993

[30] Foreign Application Priority Data

Aug. 10, 1992 [JP] Japan .................................. 4-212961

[51] Int. Cl.$^6$ ..................................................... G06F 13/00
[52] U.S. Cl. .................... 395/497.02; 395/413; 395/444; 395/492; 395/497.01; 395/497.04; 364/244.3; 364/245.2; 364/246.11; 364/246.5; 364/256.3; 364/260.2; 364/964.2; 364/DIG. 1
[58] Field of Search ......................... 395/497.01–497.04, 395/413, 444, 492

[56] References Cited

U.S. PATENT DOCUMENTS

| | | | |
|---|---|---|---|
| 4,703,422 | 10/1987 | Kinoshita et al. | 395/444 |
| 4,771,375 | 9/1988 | Beglin et al. | 395/438 |
| 5,155,835 | 10/1992 | Belsan | 395/441 |
| 5,193,171 | 3/1993 | Shinmura et al. | 395/440 |
| 5,313,631 | 5/1994 | Kao | 395/600 |
| 5,367,698 | 11/1994 | Webber et al. | 395/800 |
| 5,404,478 | 4/1995 | Arai et al. | 395/416 |
| 5,426,752 | 6/1995 | Takahashi et al. | 395/419 |

FOREIGN PATENT DOCUMENTS 63-020552   1/1988   Japan .
63-128454   6/1988   Japan .

OTHER PUBLICATIONS

Katada, Hisashi, et al. "Paging Algorithm Using Extended Storage—Its Design and Evaluation," The Information Processing Society, OS Study Group, Mar. 15, 1991, pp. 1–8. (Provided in Japanese with English Abstract.).

Hitachi Manual, "Center Operation," (6180-3-101-10), pp. 130–133. (Japanese).

*Primary Examiner*—Frank J. Asta
*Attorney, Agent, or Firm*—Fay, Sharpe, Beall, Fagan, Minnich & McKee

[57] ABSTRACT

In a storage control method for use in a computer system having a main storage, a first external storage, and a second external storage having an access speed higher than that of the first external storage, a check is made for a free area of the second external storage to decide a size of the free area. The size is compared with a predetermined first reference value. If the size is smaller, to prepare a free area having a size not less than the first reference value, the storage contents are transferred from the second external storage to the first external storage. If the free area size is larger than the first reference value, the size is next compared with a predetermined second reference value greater than the first reference value. If the size is larger than the first reference value and smaller than the second reference value, a predetermined amount of the storage contents are transferred from the second external storage to the first external storage.

22 Claims, 10 Drawing Sheets

DATA TRANSFER CONTROL OF VIRTUAL STORAGE SUPPORTED BY THREE-LEVEL HIERARCHICAL STORAGE

BACKGROUND OF THE INVENTION

The present invention relates to a computer system, and in particular, to a virtual storage control unit in a computer system including two external storages having mutually different processing speeds.

Figure 1:
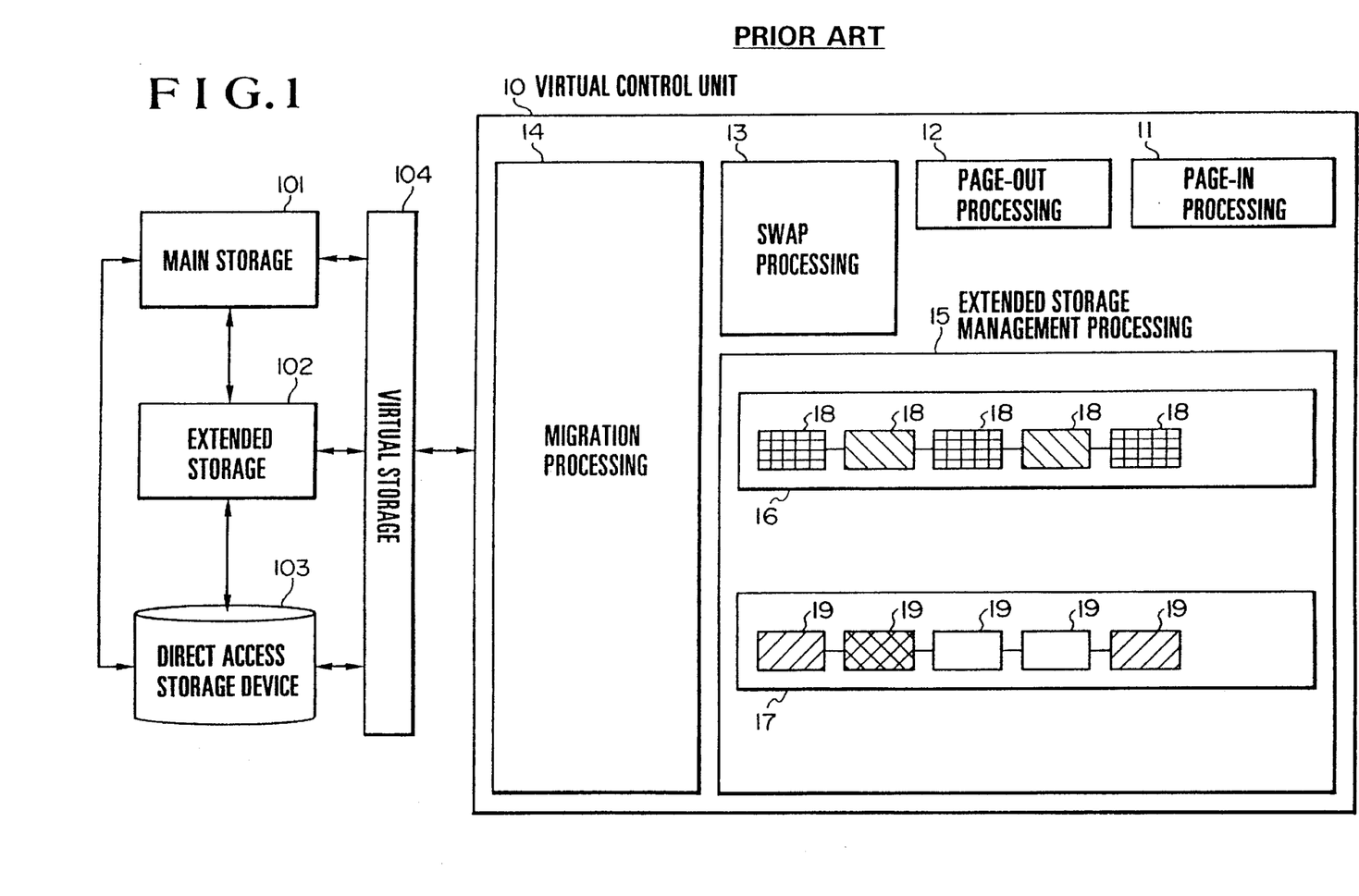
FIG. 1 is a block diagram showing the overall configuration of a conventional virtual storage control system.

Recently, in practical use, there has been a computer system adopting a virtual storage system in which as for an extended storage configuration, there is disposed, in addition to a magnetic disk unit or a direct access storage device, an extended storage which can be accessed at a higher speed as compared with the magnetic disk. FIG. 1 shows an example of the constitution of a conventional virtual storage control unit employed in such a computer system above.

The system of FIG. 1 includes a main storage 101, an extended storage 102, a direct access storage device 103, a virtual storage 104, and a virtual storage control unit 10. The controller 10 includes a page-in processing 11 for transferring in page units the contents of the virtual storage 104 from the storage 102 or the device 103 (the storage 104 and the device 103 will be collectively called an external storage herebelow) to the main storage 101, a page-out processing 12 for transferring in page units the contents of the virtual storage 104 from the main storage 101 to the external storage, a swap processing 13 for transferring in space units the contents of the virtual storage 104 between the main storage 101 and the external storage, a migration processing 14 for transferring the contents of the virtual storage 104 from the extended storage 102 to the device 103, and an extended storage management processing 15 for managing areas of the extended storage 102. In this regard, a term "page in" implies to transfer in page units the contents of the virtual storage 104 from the external storage to the main storage 101. Conversely, a term "page out" means to move in page units the contents of the virtual storage 104 from the main storage 101 to the external storage. In addition, a term "migration" designates to move the contents of the virtual storage 104 from the extended storage 102 to the random access storage device 103.

A virtual storage system in a computer system including extended storages as above has been described, for example, in the JP-A-63-20552.

Figure 2:
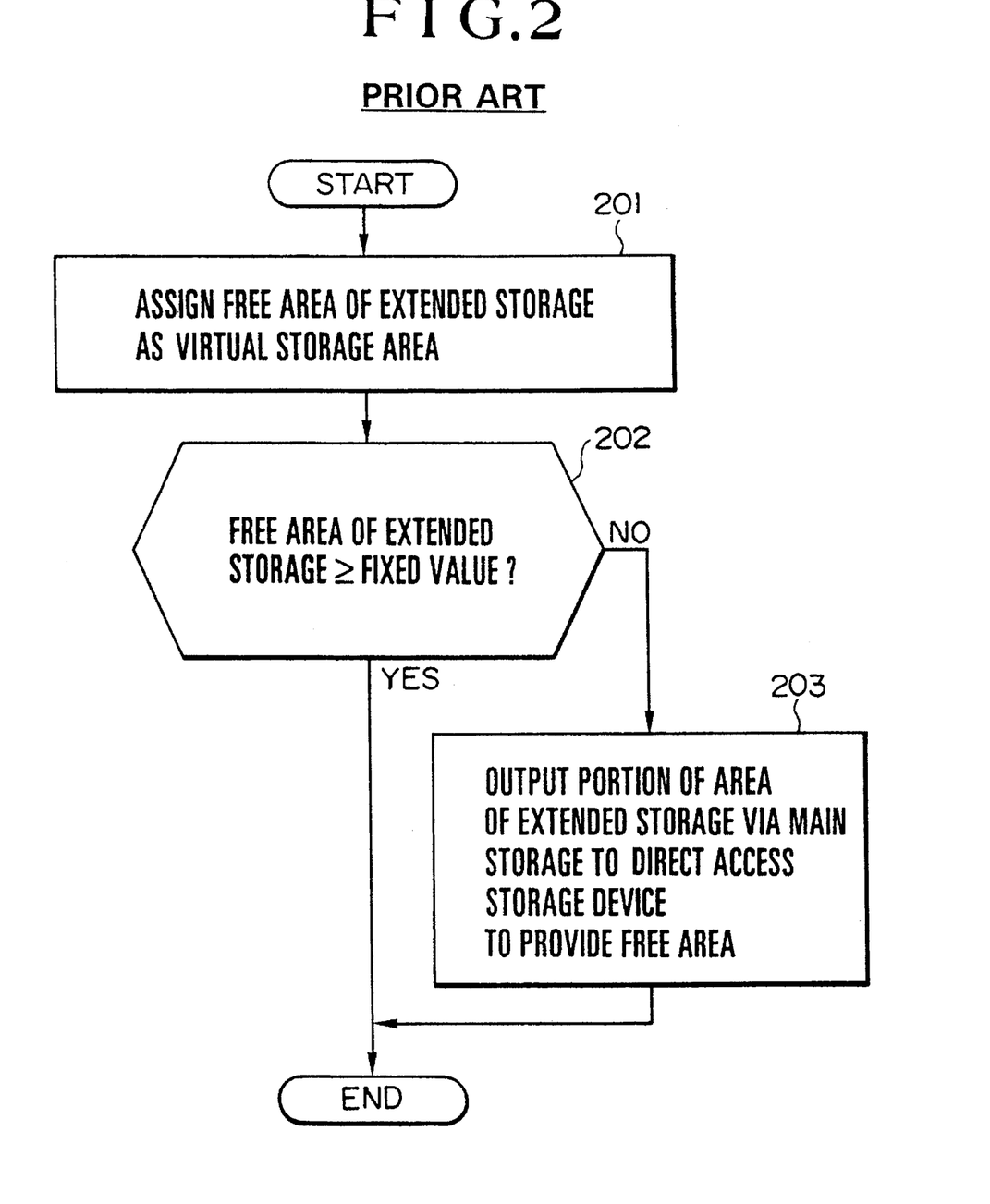
FIG. 2 is a flowchart showing a processing procedure of a migration control in a prior art.

FIG. 2 shows a flowchart of operation in the migration of a virtual storage system in the prior art. Each time an available area of the storage 102 is assigned to a page of the virtual storage (step 201), the migration processing 14 checks a capacity of free space of the extended storage 102 (step 202). When the free space capacity becomes equal to or less than a predetermined value, a portion of the reserved area of the storage 102 is transferred via a portion of the main storage 101 to be saved in the device 103, thereby keeping the free area of the storage 102 at least equal the fixed value (step 203). In an operation to move a page form the main storage 101 to the external storage 102 or 103, when the storage 102 has a free area, the page-out processing 12 assigns the available area to the page so as to output the contents of the page from the storage 101 to the storage 102. In a case where the storage 102 cannot afford such an available area for the page, the contents of the page are outputted to the storage device 103. In the processing to achieve a page-in operation for the storage contents not existing in the storage 101, the page-in processing 11 first examines the contents of the storage 102. If the storage 102 contains a page to be subjected to the page-in, data of the contents of the page is transferred therefrom to the main storage 101.

A technology related to the extended storage management processing 115 has been described in the JP-A-63-128454. An extended storage management table to manage each page of the extended storage 102 is queued in a queue 16 to which a table entry 18 being used is registered and a queue 17 to which an available (free) table entry 19 is registered. At allocation of an extended storage area, the first entry (on the right side in the diagram) is selected from the queue 17 and is then moved to the last position (on the left side in FIG. 1) of the queue 16. Moreover, in a migration, the first entry 17 is selected from the queue 16 to be set to a free state and is then moved to the last position of the queue 17.

Furthermore, in an article "Paging Algorithm using Extended Storage—Its Design and Evaluation" (the Information Processing Society, OS Study Group, Mar. 15, 1991), there has been described an extended storage page frame release function to release an area of an extended storage during a page-in operation so as to expand an effective capacity of the extended storage.

In addition, in page 131 of an HITAC Manual "Center Operation" (6180-3-101-10), there has been described characteristics of areas related to swap-in and swap-out operations. Namely, for a space undergone a swap-out operation due to an insufficient capacity of the main storage, a swap recommendation value becomes to be larger with a lapse of time and hence the space is likely to be subjected to a swap-in operation; whereas, for a space undergone a swap-out operation due to a wait for an input from a terminal, the chance to undergo a swap-in operation is reduced with a lapse of time. In this regard, a swap-out operation denotes to move all pages in the main storage assigned to a virtual space in a multi virtual storage system from the main storage to an external storage. A swap-in operation designates an operation reverse thereto.

According to the prior art, a migration takes place when the amount of free areas of the extended storage becomes equal to or less than a predetermined value. In a case where the amount of free areas to commence the migration is set to a small value, when the system has a large variation in its load, the page-out operation frequently occurs at a high-load period of time and hence the free areas of the extended storage are used up in a short period of time. This leads to occurrences of page-out operations onto a direct access storage device due to a wait for allocation of free areas. As a result, there appears a page-out delay and hence the wait time for memory allocation is increased, which lowers the processing efficiency. Conversely, when the amount of free areas to commence the migration is set to a large value, a page-in operation frequently occurs from the direct access storage device to the main storage for reusable areas in the extended storage, thereby increasing the page-in time. Moreover, to improve the processing efficiency in the high-load state, if the capacity of the extended storage is increased, the volume of available area is increased in the low-load state, which deteriorates utilization efficiency of the extended storage.

Furthermore, according to the conventional migration system, there does not appear any particular problem when an area of the extended storage released due to a page-in operation is allocated to another page. However, when an area of the extended storage released due to a migration is allocated to another page, to achieve a page-in operation to move the data of the area released due to the migration to the direct access storage device, there occurs input and output operations. This leads to a problem of decrease in the processing efficiency.

In addition, according to a multi virtual storage system managing a plurality of virtual spaces or storages, for a space associated with a swap-out operation due to a wait for a terminal input, the chance of a swap-in operation is lowered as time is elapsed; whereas, for a space associated with a swap-out operation due to an insufficient capacity of the main storage, the chance of a swap-in operation is increased with a lapse of time, which causes the following problem. Namely, due to selection of areas in the extended storage for migration, when an identical algorithm is applied to these swap-in operations, the chance of the swap-in operation from the extended storage is decreased for the spaces of one of the swap-out operations.

SUMMARY OF THE INVENTION

It is therefore an object of the present invention to provide a virtual storage control unit capable of improving the processing efficiency of the extended storage in the high-load state without lowering the utilization ratio thereof, thereby retaining a stable efficiency with respect to variation in the load.

In order to achieve the object above, according to the present invention, there is provided a virtual storage control method for use in a computer system having a main storage, a low-speed external storage, and a high-speed external storage. In a favorable mode thereof, a check is made for free areas of the high-speed external storage such that when the capacity of the free areas is smaller than a predetermined first reference value, a portion of the contents of a virtual storage area is transferred from the high-speed external storage to the low-speed external storage, thereby preparing free areas of a capacity not less than the first reference value. Moreover, when the capacity of the free areas is more than the first reference value and is less than a predetermined second reference value larger than the first reference value, the contents of the virtual storage area of a predetermined capacity are transferred from the high-speed external storage to the low-speed external storage.

Furthermore, a virtual storage control unit according to the present invention for use in a computer system having a main storage, a low-speed external storage, and a high-speed external storage includes in a preferred mode thereof first transfer means for transferring data from the main storage to the high-speed external storage, second transfer means operative, when the capacity of free areas in the high speed external storage is less than or equal to a predetermined first reference value, for transferring a predetermined first amount of the contents of the high-speed external storage to the low-speed external storage, and third transfer means operative, when the capacity of the free areas in the high-speed external storage is more than or equal to the first reference value and is equal to or less than a predetermined second reference value, for transferring a predetermined second amount of the contents of the high-speed external storage to the low-speed external storage repeatedly at a predetermined interval of time.

In the virtual storage control according to the present invention, even when the amount of free areas of the high-speed external storage is more than or equal to a predetermined value, a predetermined amount of the contents of the virtual storage is repeatedly moved from the high-speed external storage to the low-speed external storage. In this manner, it is possible in the present invention to increase the migration amount at the low loads of the computer, but decrease it at the high loads thereof, when the amount of the free areas of the high-speed external storage is smaller than a second reference value. Resultantly, even when a page-out operation is frequently conducted due to variation in the load, there are allocated areas prepared through the migration beforehand accomplished when the load is low (to transfer data from the high-speed external storage to the low-speed external storage), thereby reducing the page-out delay. Furthermore, when compared with increase in the capacity of the high-speed external storage, the provision above can improve the utilization ratio of the high-speed external storage in a low-load state with a comparable page-out delay.

Moreover, even after the contents of the high-speed external storage are transferred to the low-speed external storage through the migration, when there remains an address of the high-speed external storage in the address translation or conversion table, if an area indicated by the address is not assigned to another virtual storage area, it is possible to assign again the identical area of high-speed external storage thus kept registered in the table, thereby reusing the area. Consequently, adding to the high-speed external storage management table a reuse possibility flag denoting whether or not a field of the address conversion table containing information of high-speed external storage allocation is in use for another purpose, it is possible only by referencing the high-speed external storage management table to determine whether or not the pertinent area is reusable in a migration.

Moreover, in a migration according to the second reference value, a reusable area of the high-speed external storage is selected to be migrated to the low-speed external storage such that even when the capacity of free areas to initiate a migration is set to a high value, the chance or possibility of reuse thereof is increased in a page-in operation, thereby suppressing increase of page-in operations from the low-speed external storage.

In addition, in a page-in operation from the high-speed external storage to the main storage, even when an area of the high-speed external storage is released to be assigned to another virtual storage area, the contents of the pertinent virtual storage area are kept remained in the main storage. Consequently, in a page-out operation of the virtual storage area, the input and output operations related thereto can be suppressed only by allocating another area of the high-speed external storage. On the other hand, if the area migrated from the high-speed external storage is assigned to another virtual storage, it is necessary to conduct a page-in operation from the low-speed external storage. According to the present invention, an area of the high-speed external storage released due to a page-in operation is assigned to a virtual storage area in preference to an area thereof which is become to be available due to a transfer of a portion of the contents thereof to the low-speed external storage. As a result, irrespective of the capacity of free areas to start the migration, the number of input/output operations as well as the mean page-in time can be minimized.

Moreover, thanks to the third pointer means which indicates a position to start migration for a queue of entries being used in the high-speed external storage management table, table entries to control reusable areas for which judgement of migration has been conducted and table entries to control areas for which judgement of migration has not been conducted yet can be queued in an identical queue, thereby reducing the CPU overhead in the migration.

In addition, with provision of sixth pointer means which denotes the first position of the entries set to an available state due to a migration for a queue of available entries in the high-speed external storage management table, processing to assign an area of the high-speed external storage set to an available state due to a page-in operation to a virtual storage area in preference to an area thereof which is become to be available due to a transfer of a portion of the contents thereof to the low-speed external storage can be easily accomplished through an operation to register an entry to the available queue. This resultantly reduces the CPU overhead in the area allocation.

Moreover, thanks to an operation to conduct, when the high-speed external storage has a small capacity, a swap-out operation to the low-speed external storage due to an insufficient capacity of the main storage for the contents thereof having a low possibility of a page-in operation from the high-speed external storage, it is possible to elongate the period of time in which a page undergone a swap-out operation due to a wait for a terminal input exists in the high-speed external storage. As a result, the ratio of the transfers from the high-speed external storage can be increased.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

The virtual storage control unit according to the present invention has the following features. First, although a reusable area and an area not reusable in the extended storage are registered to an identical in-use queue, these areas can be discriminated from each other. Second, although an area released due to a migration and an area set to an available state due to a page-in operation are registered to an identical available queue, these areas can be discriminated from each other. Third, in a migration processing, an amount of data to be transferred from the extended storage 102 to the direct access storage device 103 is determined according to an amount of free areas in the extended storage 102. Fourth, in a swap processing, a destination of data transfer is altered according to a cause of the swap operation. These features of the present invention will be clarified in the following description.

Figure 3:
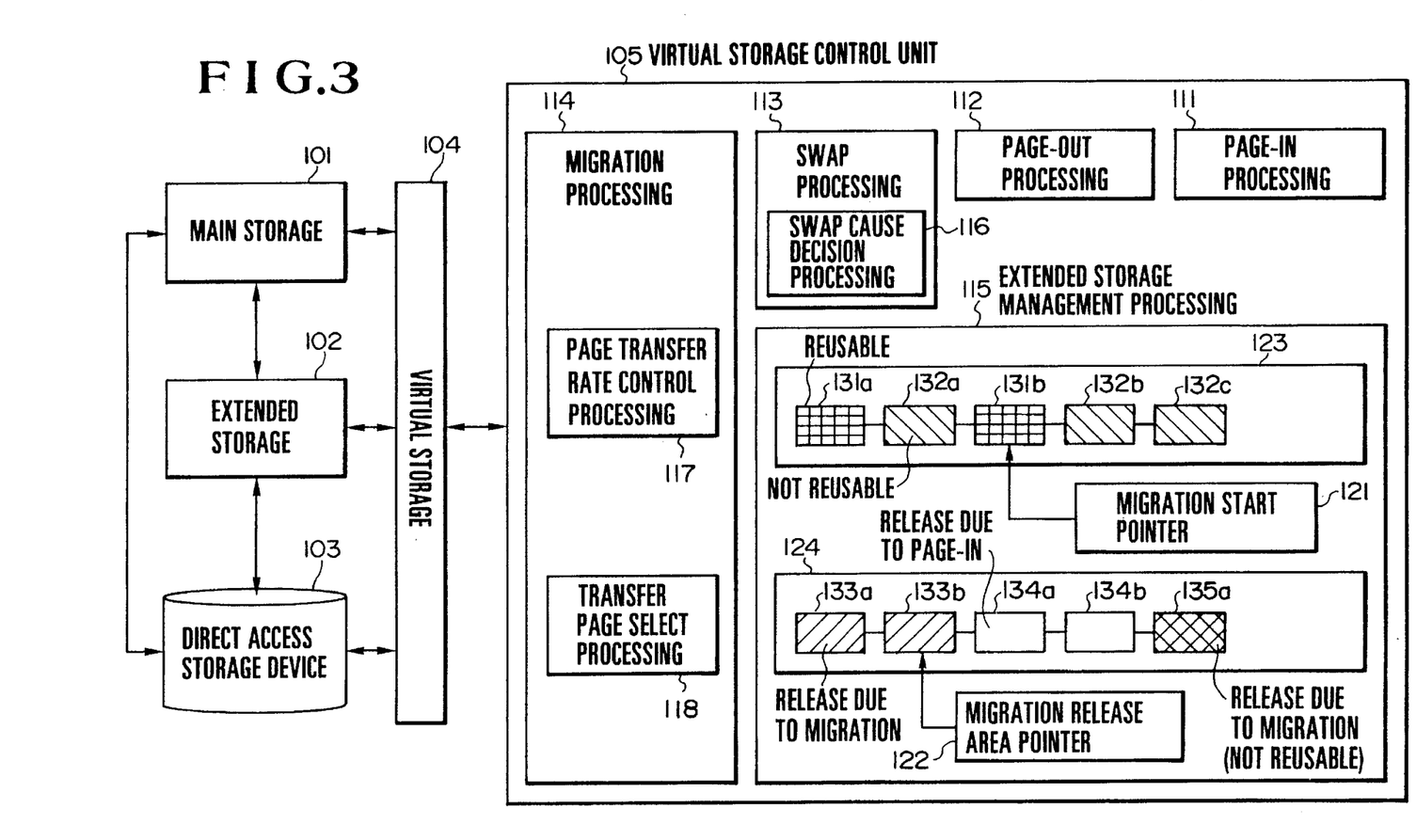
FIG. 3 is a block diagram showing the structure of a virtual storage control system in an embodiment according to the present invention; 10

FIG. 3 shows in a block diagram the logical structure of a virtual storage control system in an embodiment according to the present invention. In this configuration, a virtual storage 104 are subdivided into areas (pages). Each page or area is assigned to at least one of a main storage 101, an extended storage 102 which can be accessed by a particular instruction, and a direct access storage device 103. The storage 102 includes, for example, a semiconductor memory using a semiconductor memory device as a storage medium. As compared with the device 103, the storage 102 can be accessed in a shorter period of time. A virtual storage control unit 105 conducts processing, for example, a selection control to assign pages of the virtual storage 104 to the main storage 101, the extended storage 102, and the direct access storage device 103.

The control unit 105 includes a page-in processing 111, a page-out processing 112, a swap processing 113, a migration processing 114, and an extended storage management processing 115. The processing 113 includes a swap cause decision processing 116. The processing 114 includes a page transfer rate control processing 117 to decide a rate of data transfer from the storage 102 to the storage device 103 and a transfer page select processing 118 to select an area of virtual storage which is assigned to the storage 102 and which is to be transferred to the storage device 103.

The extended storage 102 is subdivided into areas each having a fixed size for allocation of pages of the virtual storage so as to be managed according to extended storage management table entries (ESTE's) having a one-to-one correspondence with respect to the subdivided areas. Entries ESTE's 131 to 135 are disposed in an extended storage management table arranged in the processing 115, which will be described later. Moreover, the entries ESTE's are connected to each other via a pointer to form a queue (in-use queue) 123 of extended storage areas being used or a queue (claimable or available queue) 124 of available (free) extended storage areas. In this regard, the in-use queue 123 may be subdivided into a plurality of queues according to the contents of the respective pages.

In the processing 115, reference numerals 131a and 131b indicate entries ESTE's corresponding to reusable areas of the extended storage 102 and reference numerals 132a and 132b denote entries ESTE's associated with non-reusable areas thereof. Moreover, numerals 133a and 133b stand for entries ESTE's corresponding to reusable areas thereof released by a migration and numerals 134a and 134b designate entries ESTE's associated with areas thereof released by a page-in operation. Numeral 135a indicates an entry ESTE related to a non-reusable area thereof. The processing 115 has a pointer 121 denoting an entry ESTE corresponding to an area of the extended storage as a migration start position and a pointer 122 designating the first one of the entries ESTE's of the available queue 124, the ESTE's corresponding to reusable extended storage areas released by the migration control. Decision as to whether or not an extended storage area is reusable will be described later.

Figure 4:
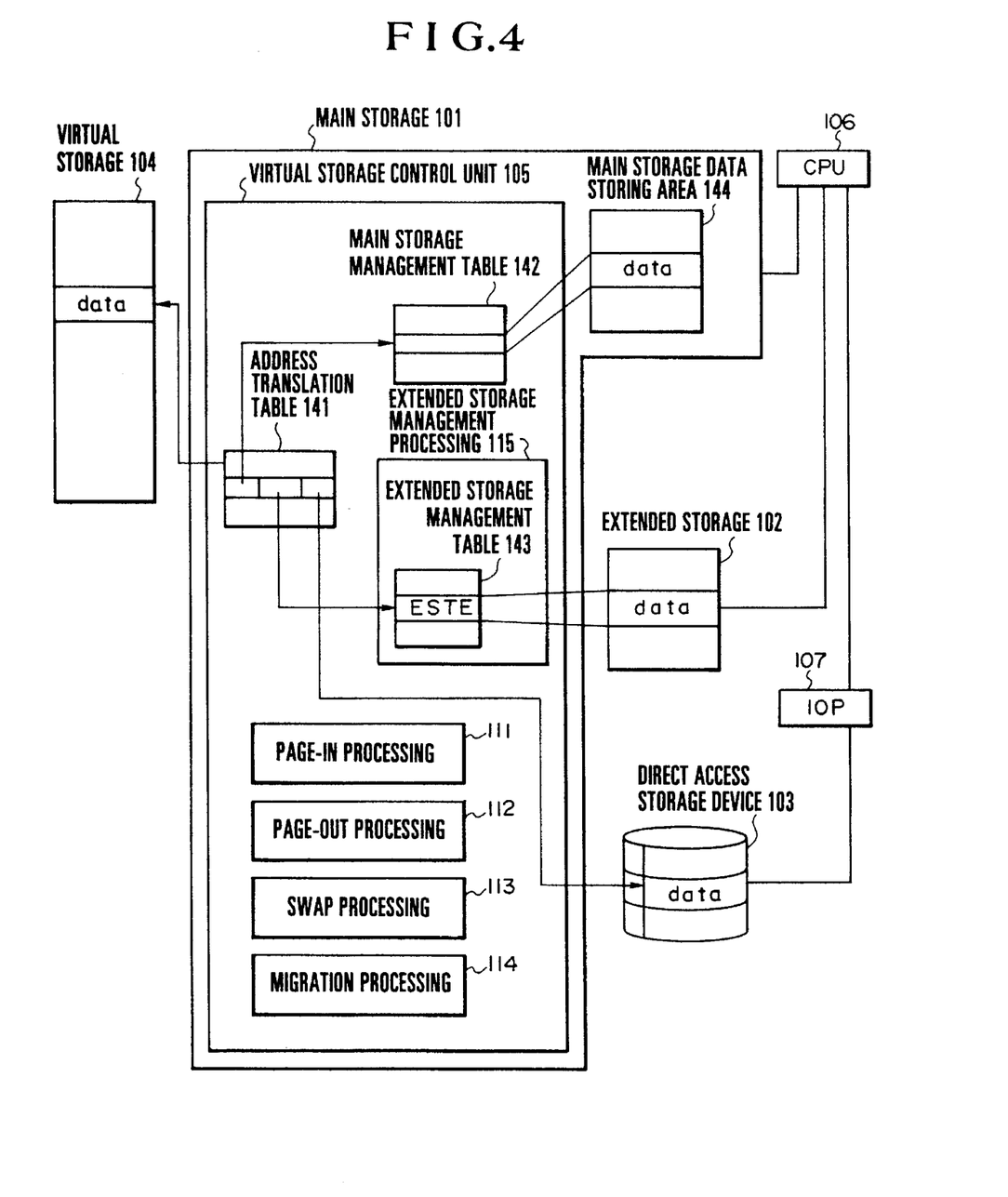
FIG. 4 is a schematic diagram showing in a hardware image the constitution of a virtual storage control system.

FIG. 4 shows in a hardware image the configuration of the embodiment. The virtual storage control unit 105 exists in the form of programs in the main storage 101 such that functions of the unit 105 are implemented when the CPU 106 executes the programs. In the connection diagram of FIG. 4, the main storage 101 is disposed as an external unit with respect to the CPU 106; however, the storage 101 may be integrally disposed in the CPU 106.

The areas respectively of the external storage 102 and the random access storage device 103 are partitioned into page-unit areas to be used as storage media for storing therein virtual storage data which cannot be arranged in the main storage 101. Between the storage 101 and 102, data is transferred via the CPU 106. On the other hand, between the storage 102 and the device 103, data is transferred via the CPU 106, an input output processor (IOP) 107, and the storage 101 or via the CPU 106 and the IOP 107.

Each page 1040 of the storage 104 has a one-to-one correspondence with respect to an entry 1410 of an address conversion table 141. Each area 1440 of a data area 144 of the main storage 101 has a one-to-one correspondence with respect to an entry 1420 of a main storage management table 142. Similarly, each area 1020 of the extended storage 102 has a one-to-one correspondence with respect to an entry ESTE 1430 of an extended storage area management table 143.

The tables 141 to 143 are disposed in the main storage 101. Entries of these tables 141 to 143 are updated according to allocation or release of virtual storage areas to or from the main storage 101, the extended storage 102, and the direct access storage device 103 due to such operations including page-in, page-out, and swap operations.

Figure 5:
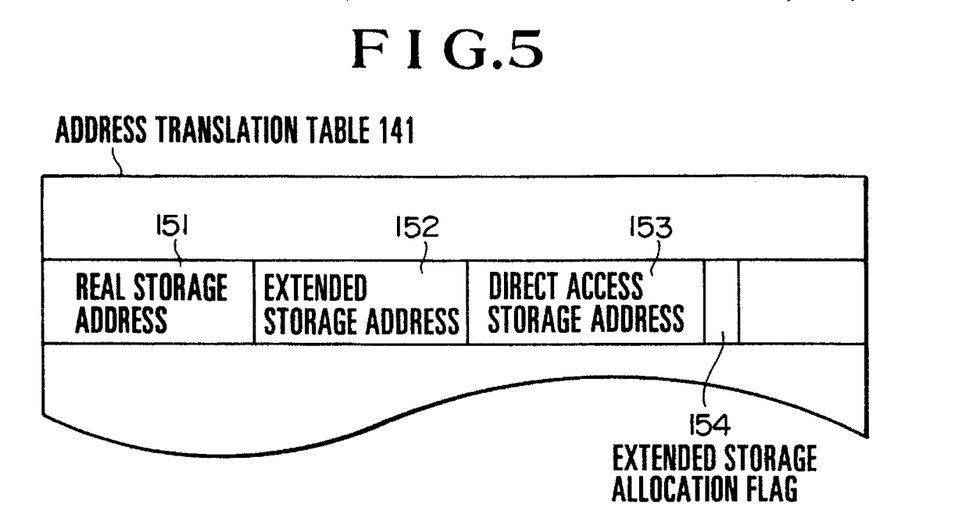
FIG. 5 is a diagram showing the configuration of an address translation or conversion table.

FIG. 5 shows the configuration of the address translation table 141. Each entry 1410 thereof includes a real or actual storage address field 151, an extended storage address field 152, a direct access storage address field 153, and an extended storage allocation flag field 154. In the field 151, when a page-in operation is effected for a virtual storage page associated with the pertinent entry, there is stored an address (real storage address) of an area of the main storage 101 allocated for the page. In the field 152, when a virtual storage page associated with the pertinent entry is allocated to the extended storage 102, there is stored an address (extended storage address) of an area of the extended storage 101 allocated for the page. Furthermore, there is stored in the field 153 an address (direct access storage address) of an area of the direct access storage device in which the contents of the virtual storage page corresponding to the pertinent entry are stored.

Figure 6:
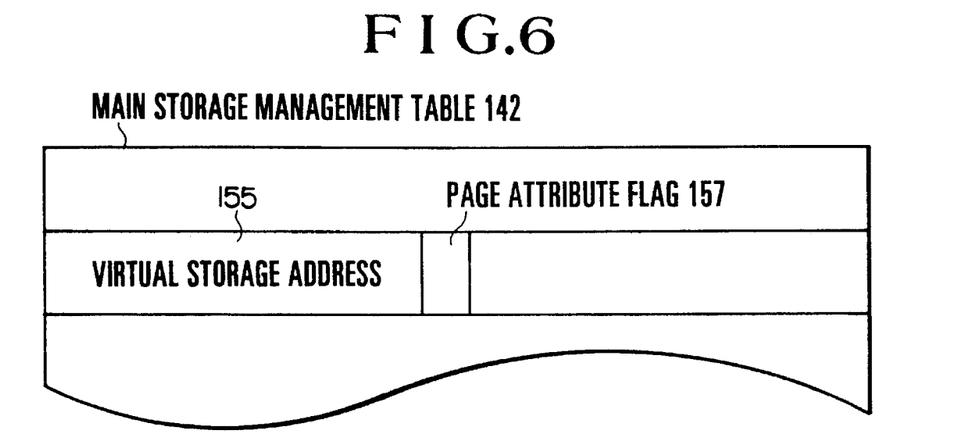
FIG. 6 is a diagram showing the construction of a main storage management table.

FIG. 6 shows the structure of the main storage management table 142. Each entry of the table 142 includes a virtual storage address field 155 and a page attribute flag field 157. In the field 155, there is stored an address (virtual storage address) corresponding to a virtual storage page assigned to an area of the main storage 101 associated with the pertinent entry. Furthermore, in the field 157, for a virtual storage page allocated to an area of the main storage 101 associated with the pertinent entry, there is stored a flag indicating a page attribute such as "duplication" or "virtual input/output", which will be described later.

Figure 7:
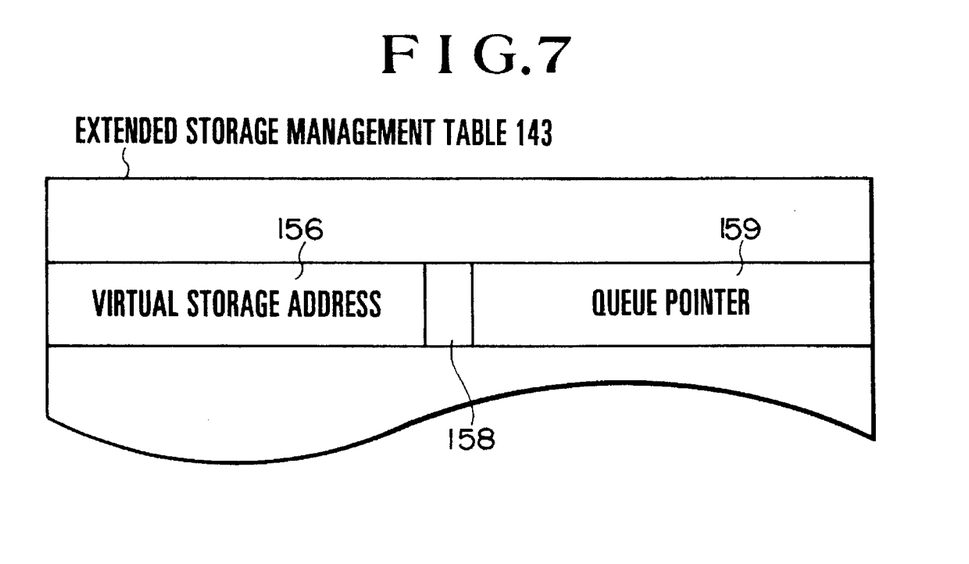
FIG. 7 is a diagram showing the structure of an extended storage management table.

FIG. 7 shows the configuration of the extended storage management table 143. Each entry ESTE 1430 thereof includes a virtual storage address field 156, a page reclaimable or reuse possibility flag field 158, and a pointer field 159. In the field 155, there is stored an address (virtual storage address) corresponding to a virtual storage page assigned to an area of the storage 102 associated with the pertinent entry. In the field 158, there is stored a flag indicating whether or not an area of the storage 102 associated with the pertinent entry is reclaimable or reusable for a page indicated by a virtual storage address set to the field 155. Moreover, in the field 159, to form a in-use queue 123 or a available queue 124, there is stored a queue pointer indicating an immediately preceding and succeeding entry in the queue.

In this connection, according to the embodiment, an actual storage address is represented by an address (or a number) of an associated entry of the main storage management table 142, not by an address of the main storage 101. The address of the main storage 101 is obtained through a computation according to the actual storage address. Similarly, an extended storage address is represented by an address (or a number) of an entry in the extended storage management table 143, not by an address of the extended storage 102. The address of the storage 102 is computed from the extended storage address. Furthermore, the page attribute flag field 157 of the table 142 may be disposed in the address translation table 142.

The tables 141 to 143 can be mutually referenced from each other.

In the fields 152 and 154 of the table 141 shown in FIG. 5, when a virtual storage page is assigned to the storage 102, there are stored flags indicating an extended storage address and completion of allocation, respectively. The field 154 is reset in response to a migration, namely, when the contents of the virtual storage page assigned to the storage 102 is moved to the storage device 103. In this operation, the extended storage address set to the field 152 is kept remained in the original state. Consequently, even when an area of the storage 102 is migrated, if a page-in operation takes place for the same virtual storage page before the area is assigned to another virtual storage page, the area of the storage 102 can be used again. In short, so long as an entry ESTE 1430 corresponding to an area of the extended storage 102 indicated by an extended storage address kept remained in the address field 152 of the table 141 associated with a virtual storage page keeps a virtual address associated with the virtual storage page, the pertinent area of the storage 102 can be reused for the virtual storage page. As above, thanks to the reuse of the area of the extended storage 102 once migrated, it is possible to minimize the input/output processing for an access to the direct access storage device 103.

Since each entry of the tables above is disposed for each page, a large amount of main storage space is used for the tables. To save the main storage areas to be thus occupied, the field 152 of the table 141 may also be utilized for another purpose. For example, when the storage device 103 is installed in a duplicated system, the field 152 is commonly used for an address of the duplicated storage device and an address of the extended storage. Furthermore, as for a virtual input/output buffer, in place of an address of the storage device 103, a position of an associated area in a file and an identification number of the file are required to be stored in the table 141. In this case, the file identification number is stored in the field 152.

In a case where the field 152 is adopted for another purpose as above, when an area of the storage 102 is assigned to a virtual storage page, an extended storage address is kept in the field 152. However, when the area undergoes a migration, there is kept, for example, an address of the direct access storage device in the field 152. Namely, at an occurrence of a migration, the extended storage address in the table 141 is lost. In consequence, the area of the storage 102 previously assigned to the page cannot be determined according to the table 141 and hence it is impossible to reuse the extended storage area.

Consequently, as an areas to be subjected to the migration, it is favorable to select a reusable area not attended with such a problem, thereby simplifying the processing of another page-in operation to the extended storage 102. To select the reusable area for migration, it is necessary to discriminate reusable areas from non-reusable areas prior to the migration. To this end, according to the embodiment, each entry ESTE 1430 has a page reclaimable flag field 158 indicating whether or not the field 152 thereof is being used for an operation other than an operation to set thereto an extended storage address associated with a virtual storage area. The flag is set to the field 158 by reference to the page attribute flag filed 157 of the main storage management table 142 in a page-out operation to the storage 102.

When attempting a migration, if the storage 102 has a sufficient free space, an area of the storage 102 corresponding to an entry ESTE 1430 having the field 158 not assigned with the flag is not selected as an object of the migration. Namely, only a reusable area can be chosen for the migration by referencing the field 158. Resultantly, even when the capacity of free areas (a second reference free capacity, which will be described later) to start the migration is set to a large value, it is possible to suppress increase in the number of page-in operations from the direct access storage device 103.

Subsequently, description will be given of each processing of the virtual storage control unit 105.

The migration processing 114 is initiated when a page-out operation is terminated or at a fixed interval of time by a resource centralized manager. The processing 114 is divided into two stages according to the free space of the extended storage 102 at the initiation thereof. Prior to a specific explanation of the migration, description will be given of an extended storage control table used in the migration.

Figure 8:
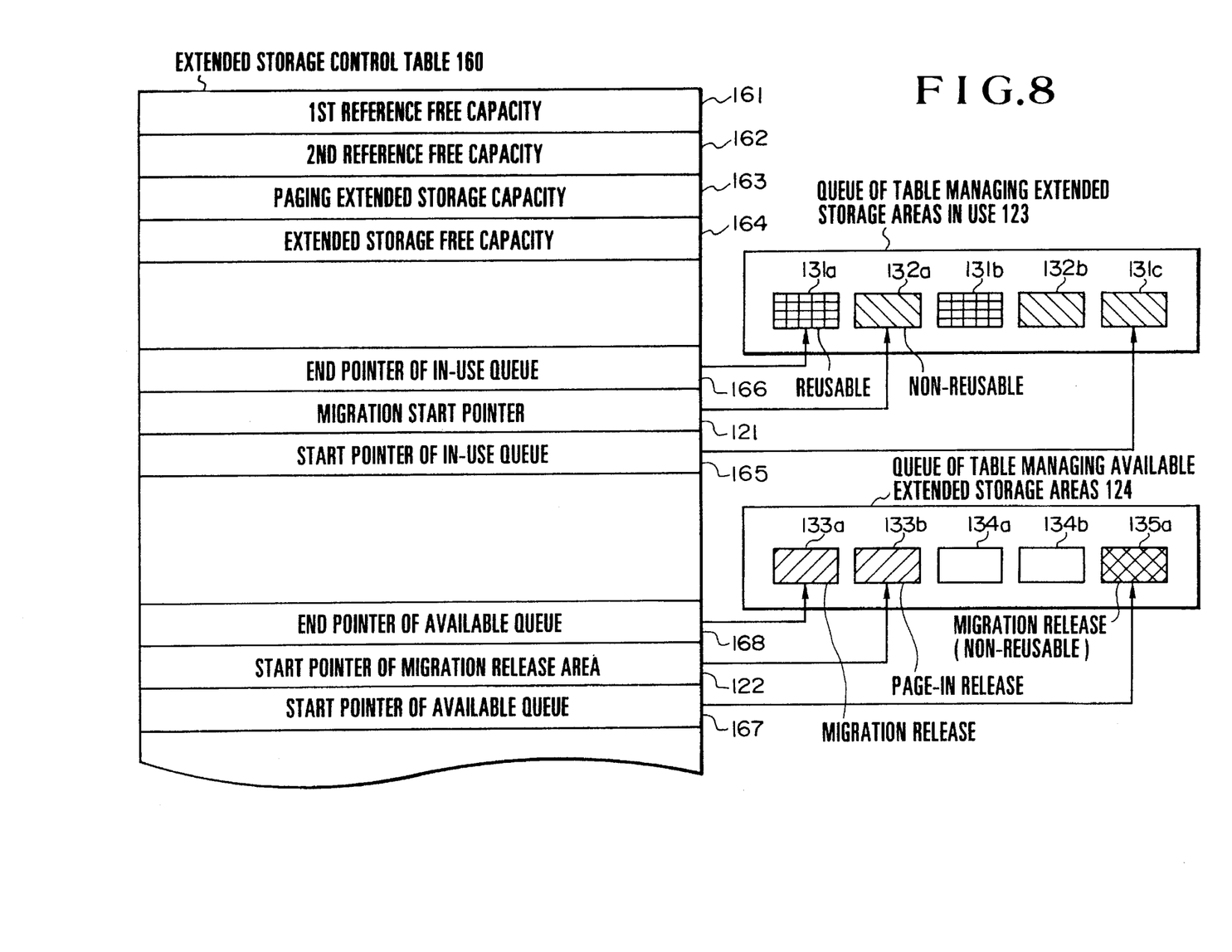
FIG. 8 is a diagram showing relationships between an extended storage control table and an extended storage management table.

FIG. 8 shows the configuration of the table 160. Although not shown in FIGS. 3 and 4, the table 160 is arranged in the extended storage management processing 115.

As can be seen from FIG. 8, the table 160 includes an entry 161 to keep therein a first reference free capacity and a second reference free capacity respectively as reference values of free capacity to initiate the migration. Moreover, in a paging extended storage capacity field 163, there is stored a capacity of paging data stored in the extended storage 102, namely, a size of the area in use. In an extended storage free capacity field 164, there is stored a capacity of an area of the storage 102 in which the paging data can be stored. Furthermore, the table 160 includes, in association with the in-use queue 123, an end pointer 166 indicating an entry ESTE located at the end of the in-use queue 123, a migration start pointer 121, and a start pointer 165 denoting an entry ESTE located at the beginning of the in-use queue 123. In addition, there are disposed as pointers related to the available queue 124, namely, an end pointer 168 indicating an entry ESTE located at the end of the available queue 124, a release area start pointer 122 designating an entry ESTE at the beginning of the entries ESTE's of the reusable areas, and a start pointer 167 indicating an entry ESTE located at the beginning of the available queue 124. FIG. 8 also shows relationships between the pointers of the table 160 and the entries ESTE's 131 to 135 of the table 143.

Figure 9:
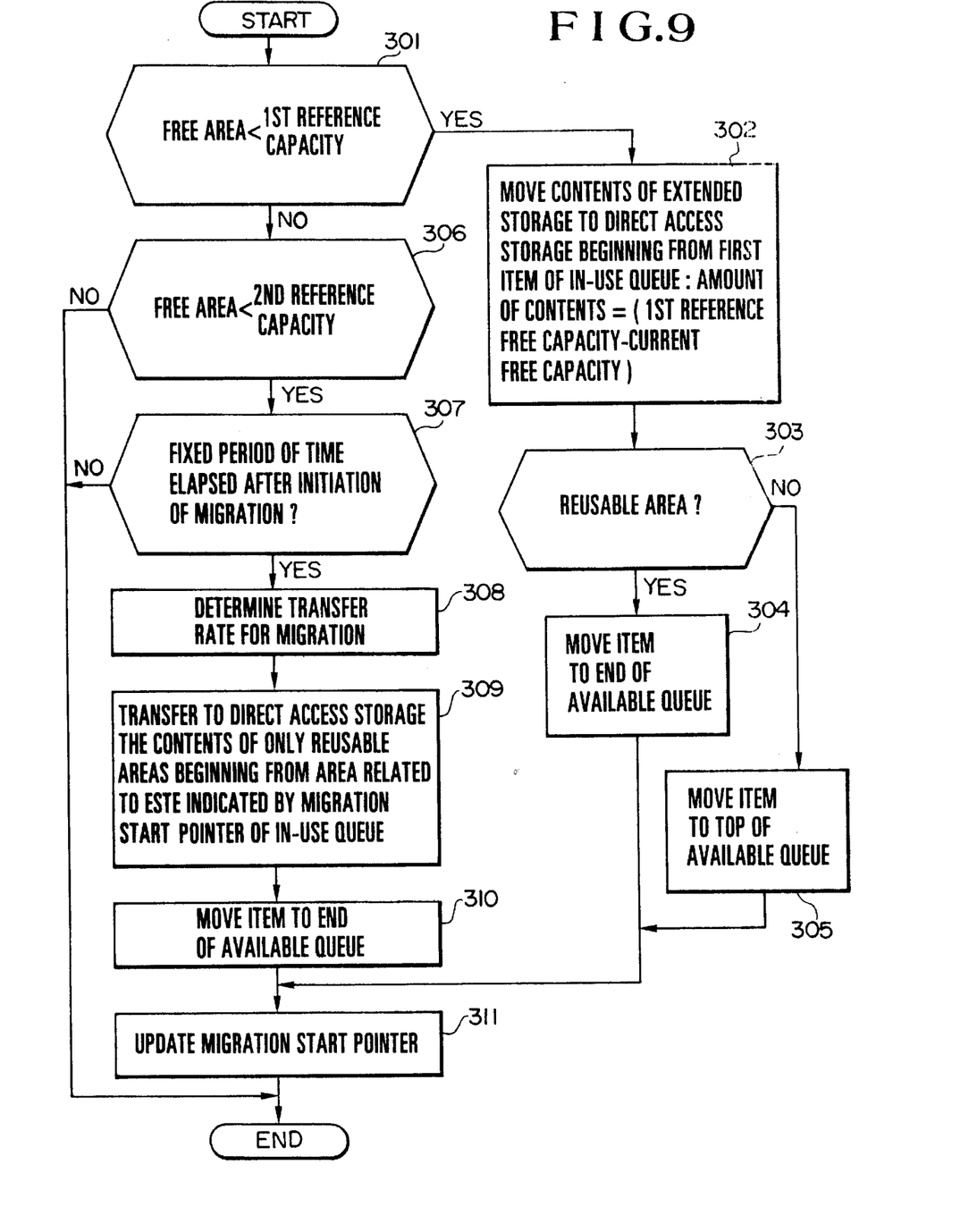
FIG. 9 is a flowchart showing an example of a processing procedure of a migration control.

FIG. 9 is a flowchart of the migration conducted in the migration processing 114. When the processing 114 is initiated, the extended storage control table 160 is referenced so as to compare the extended storage free capacity 164 with the first reference free capacity 161 (step 301). If the free capacity 164 is smaller than the first reference free capacity 161, an amount of data is transferred in area units from the extended storage 102 to the direct access storage 103, the amount being equivalent to the difference between the first reference free capacity 161 and the free capacity 164. The data to be transferred is sequentially selected beginning from an area of the extended storage 102 corresponding to an entry ESTE 132c specified by the first pointer 165 of the in-use queue 123, namely, from an area first undergone a page-out operation (step 302). After the data is transferred from the storage 102 to the storage device 103, the area of the storage 102 is checked by reference to the page reclaimable flag field 158 of the associated entry ESTE, thereby determining whether or not the area is reusable (step 303). If this is the case, the entry ESTE is queued in the available queue 124 to follow the entry ESTE 133a indicated by the last pointer 168 of the queue 124. Namely, the ESTE is registered as the last item of the queue 124. Thereafter, the pertinent area of the extended storage is released (step 304).

On the other hand, when the area is judged to be a non-reclaimable area as a result of the judgement in the step 303, the entry ESTE is connected to precede the entry ESTE 135a designated by the first pointer 167 of the claimable queue 124, thereby registering the entry ESTE as the first entry thereof (step 305). The area corresponding to the entry ESTE arranged as the first item of the queue 124 is assigned, in a subsequent page-output operation, for a virtual storage page to be subjected to a page-out operation in preference to a reusable area or an area released by a page-in operation.

In the step 301, when the free area capacity 164 is larger than the first reference free area capacity 161, the capacity 164 is then compared with the second reference free area capacity 162 (step 306). If the capacity 164 exceeds the capacity 162, the processing is terminated in this state. Otherwise, a check is conducted to determine whether or not a predetermined period of time has been elapsed from the previous migration. If the period elapsed is less than the interval for initiation of the migration, the processing is finished without achieving the migration (step 307). The initiation interval is assumed to be about several seconds; however, the user may set the interval in consideration of the CPU overhead time in the migration processing and the rate of variation in the free area capacity of the extended storage 102.

In the step 307, if the elapsed period exceeds the interval to start the migration, the system executes the migration. In this processing, an amount of data to be transferred to the storage 103 is first determined (step 308). The amount of data to be transferred by a migration is set such that the operation does not exert any adverse influences on the input/output operations of the files and each of the utilization ratios of the channels and the storage 103 associated with paging input/output operations is less than 100 percent. Moreover, the amount of data to be transferred by a migration may be altered according to the free space of the extended storage 102.

Next, the system checks the entries connected to the in-use queue 123 in a sequence (from the right to the left in the diagram) beginning from the entry ESTE 131b denoted by the migration start pointer 121 to decide whether or not the associated area of the storage 102 is reusable. If this is the case, the data items of the area are sequentially transferred to the storage device 103 (step 309). In this regard, in the last position of the queue 123, there is additionally arranged an entry ESTE of the area of the main storage 101 undergone the page-out processing, which will be described later. The entry of the area transferred to the storage 103 as a result of the migration is dequeued from the queue 123 and is queued in the available queue 124 at a location next to the entry ESTE 133a indicated by the end pointer 168 thereof. Thereafter, the transferred area of the storage 102 is released (step 310).

After the migration is completely finished, the migration start pointer 121 is modified to point an entry ESTE next to the checked entry ESTE (or the entry ESTE associated with the area last transferred to the storage 103; step 311). As a result of the migration, before the entry ESTE denoted by the migration start pointer 121 (on the right side in the diagram), there remain only the entries ESTE's corresponding to the reusable areas.

Figure 10:
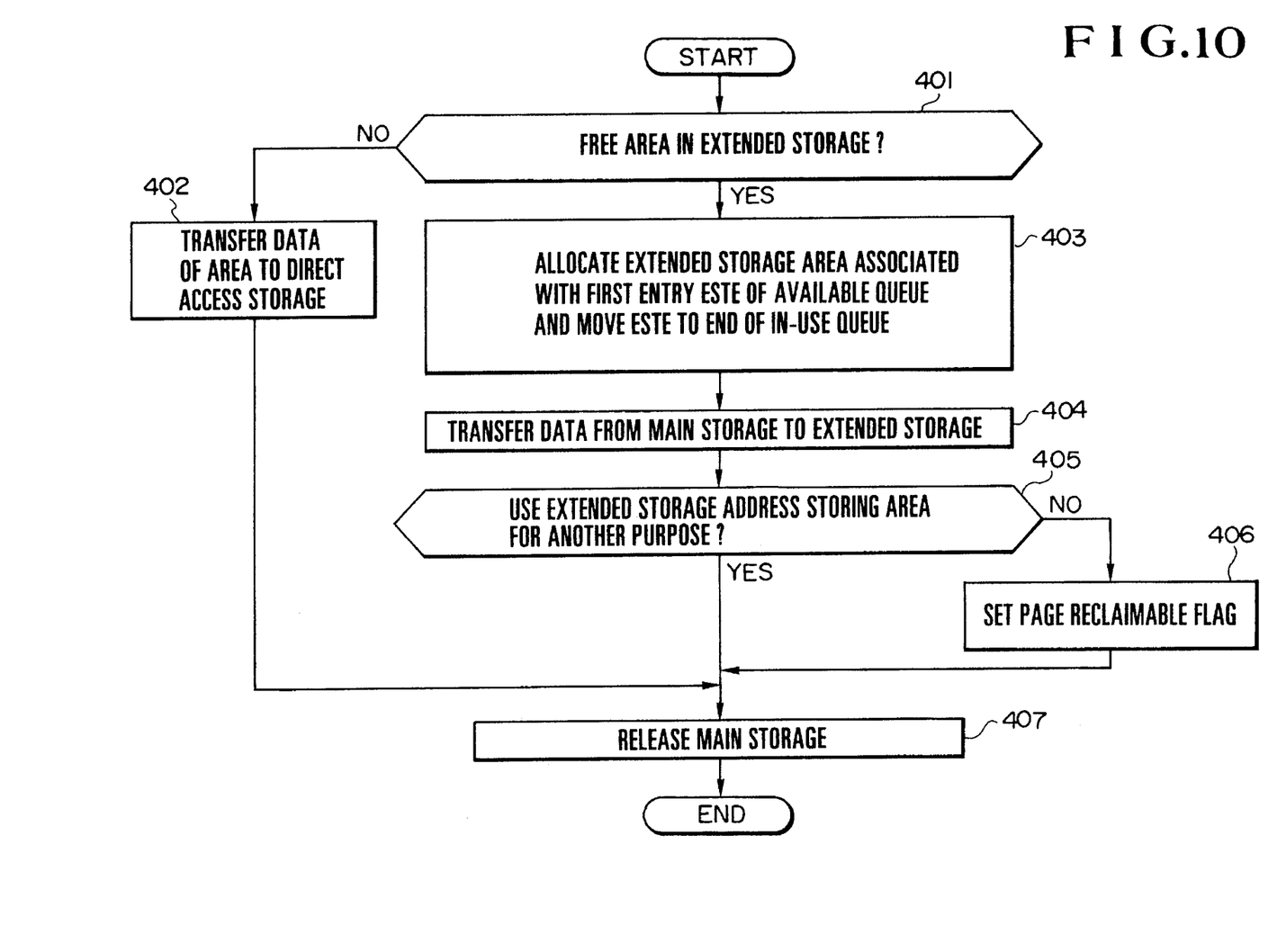
FIG. 10 is a flowchart showing an example of a processing procedure of a page-out control.

FIG. 10 shows a flowchart of the page-out processing 112.

When the processing 112 is invoked, a check is made to determine whether or not the extended storage 102 has free areas (step 401). If the free areas are missing, an area of the main storage 101 to undergo the page-out operation is transferred to the storage 103 (step 402) and then the pertinent area of the main storage 101 is released (step 407).

If the free areas are present in the storage 102 in the step 401, an area associated with the first entry ESTE 135a of the queue 124 is assigned as an area for the area of the main storage 101 to undergo the page-out operation. The entry ESTE 135a is removed from the queue 124 to be registered to the in-use queue 123 at a location next to the entry ESTE 133a denoted by the end pointer 166 (step 403). The contents of the storage 101 as an object of the page-out operation are transferred to the area of the storage 102 assigned for the page-out operation (step 404). After the transfer of the area from the storage 101 to the storage 102 is completely accomplished as a result of the page-out operation, whether or not the extended storage address field 152 of the address translation table 141 is utilized for another purpose is determined by referencing, for example, the page attribute flag 157 of the main storage management table 142 (step 405). If the field 152 is not used for another purpose, a flag is set to the page reclaimable flag field 158 (step 406). Finally, the main storage area is released to terminate the processing (step 407).

In the queue 124, entries ESTE's corresponding to non-reusable areas and entries ESTE's associated with the areas released by the page-in operation are arranged at positions before entries ESTE's corresponding to areas which are released by the migration and which can be reused. In the page-out processing, a virtual storage page as object of the page-out operation is sequentially assigned beginning from an area corresponding to the first entry ESTE of the queue 124. Consequently, non-reusable areas and areas released by the page-in operation are assigned for the page-out operation in preference to the areas which are released by the migration and which can be reused. The data items remaining in the areas of the extended storage 102 thus released by the page-in operation exist in the main storage 101. In consequence, even when the extended storage areas are assigned for other virtual storage pages, there does not occur any particular problem. Moreover, also when the virtual storage page is subjected to a page-out operation, the page transfer is achieved by a CPU instruction at a high speed and hence the processing efficiency is not lowered. On the other hand, when an area of the storage released by the migration is allocated for another virtual storage page, the contents of the virtual storage page thus transferred exist only in the storage 103. In consequence, when an area of the storage 102 released by the migration is assigned to a virtual page to undergo a page-out operation, in a page-in operation conducted later for the virtual storage page which is previously allocated for the area and of which the contents are transferred to the storage 103 by the migration, it is necessary to transfer the contents of the page by an input/output instruction from the storage 103 to the main storage 101. According to the embodiment, in a page-out processing for an extended storage area released by the migration, the priority of page allocation is lowered for a virtual page to undergo the page-out operation so as to remain the migrated area in the extended storage 102, thereby minimizing the input/output processing (to transfer the stored contents from the storage 103 to the main storage 101) in the page-in operation.

Figure 11:
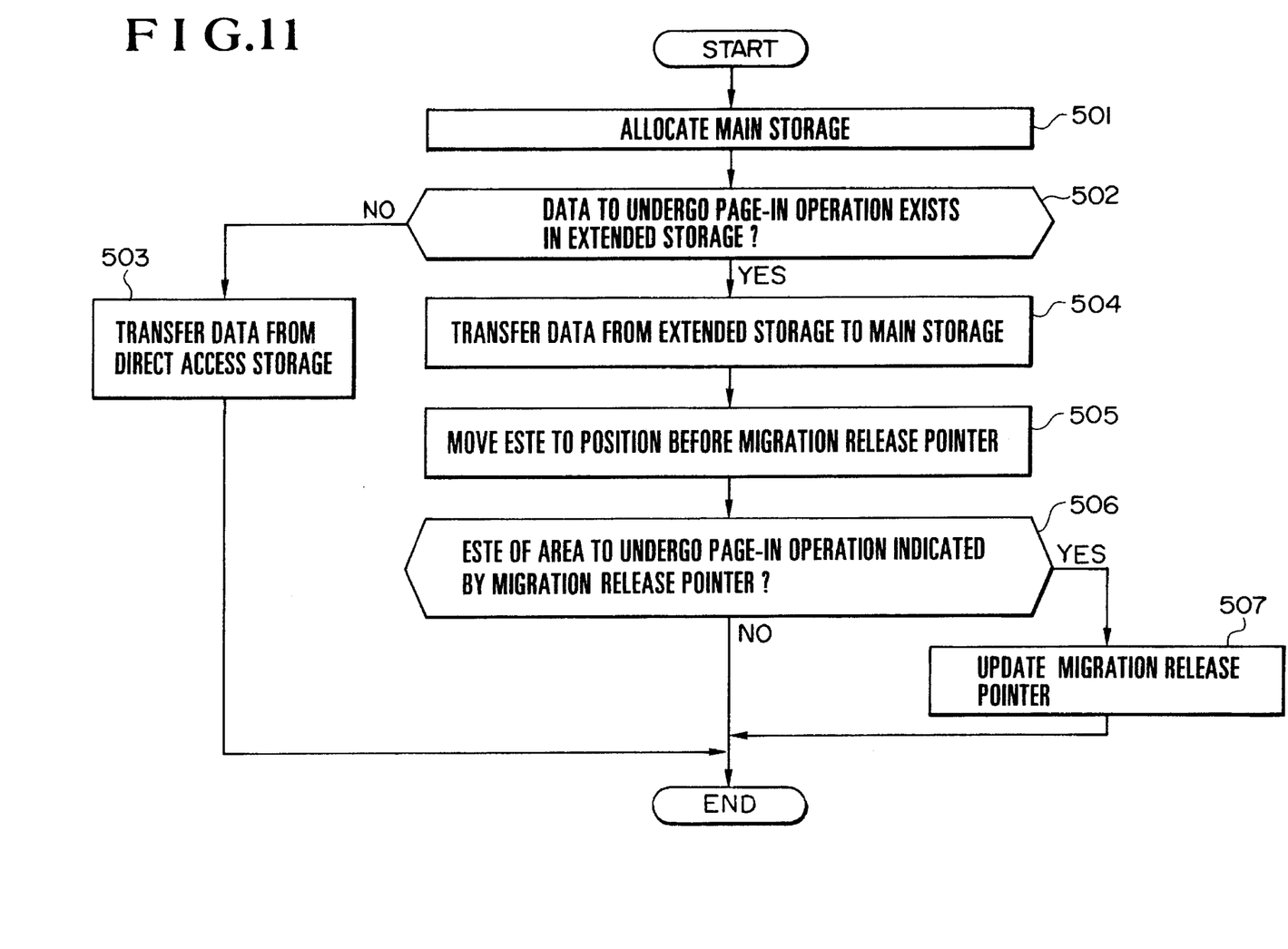
FIG. 11 is a flowchart showing an example of a processing procedure of a page-in control.

Subsequently, the page-in processing 111 will be described by reference to FIG. 11 showing the operation procedure of the page-in processing 111.

The processing 111 allocates an area of the main storage 101 for a virtual storage page to undergo a page-in operation (step 501). Next, a check is made to decide whether or not the data of the virtual storage page exists in the extended storage 102 (step 502). In the step 502, the address translation table 141 is first referenced to determine whether or not a flag is already set to the extended storage allocation flag field 154 for the entry corresponding to the virtual storage page to be subjected to the page-in operation. If the flag is already set thereto, it is assumed that the contents of the virtual storage page are present in the extended storage 102. Even if this is not the case, in a case where an extended storage address is beforehand set to the extended storage address field 152 and a virtual storage address stored in the virtual address field 156 of an entry ESTE indicated by the extended storage address is associated with the virtual storage page to undergo the page-in operation, the contents of the page can be assumed to exist in the storage 102, thereby executing the processing.

If the pertinent virtual storage page is missing in the storage 102, the page-in operation is carried out such that the contents of the page are transferred from the pertinent area of the storage 103 to the main storage 101 (step 503).

If the contents of the objective virtual storage page are present in the extended storage 102, the data of the area of the extended storage 102 is transferred to the main storage (step 504). Thereafter, the entry ESTE corresponding to the area of the extended storage as the destination of the data transfer is removed from the in-use queue to be registered to the available queue 124 at a position before the entry ESTE denoted by the migration release area pointer 122 of the queue 124. Moreover, the area of the extended storage is released (step 505). As a result of the operation, the entry ESTE associated with the area of the extended storage 102 released by the page-in operation is arranged in the available queue 124 at a position before the entry ESTE corresponding to the area released by the migration. After this point, the areas of the storage 102 are sequentially assigned for virtual storage pages beginning from an area associated with the first entry ESTE of the queue 124, thereby reusing the areas. Namely, the areas released by the page-in operation are allocated in preference to those released by the migration.

In a case where the migration release area pointer 122 indicates an entry ESTE associated with the area of the extended storage 102 from which data is transferred to the main storage 101, namely, where the page-in operation is effected for the area corresponding to the entry ESTE indicated by the pointer 122, the pointer 122 is updated to indicate the next entry ESTE (steps 506 and 507).

Figure 12:
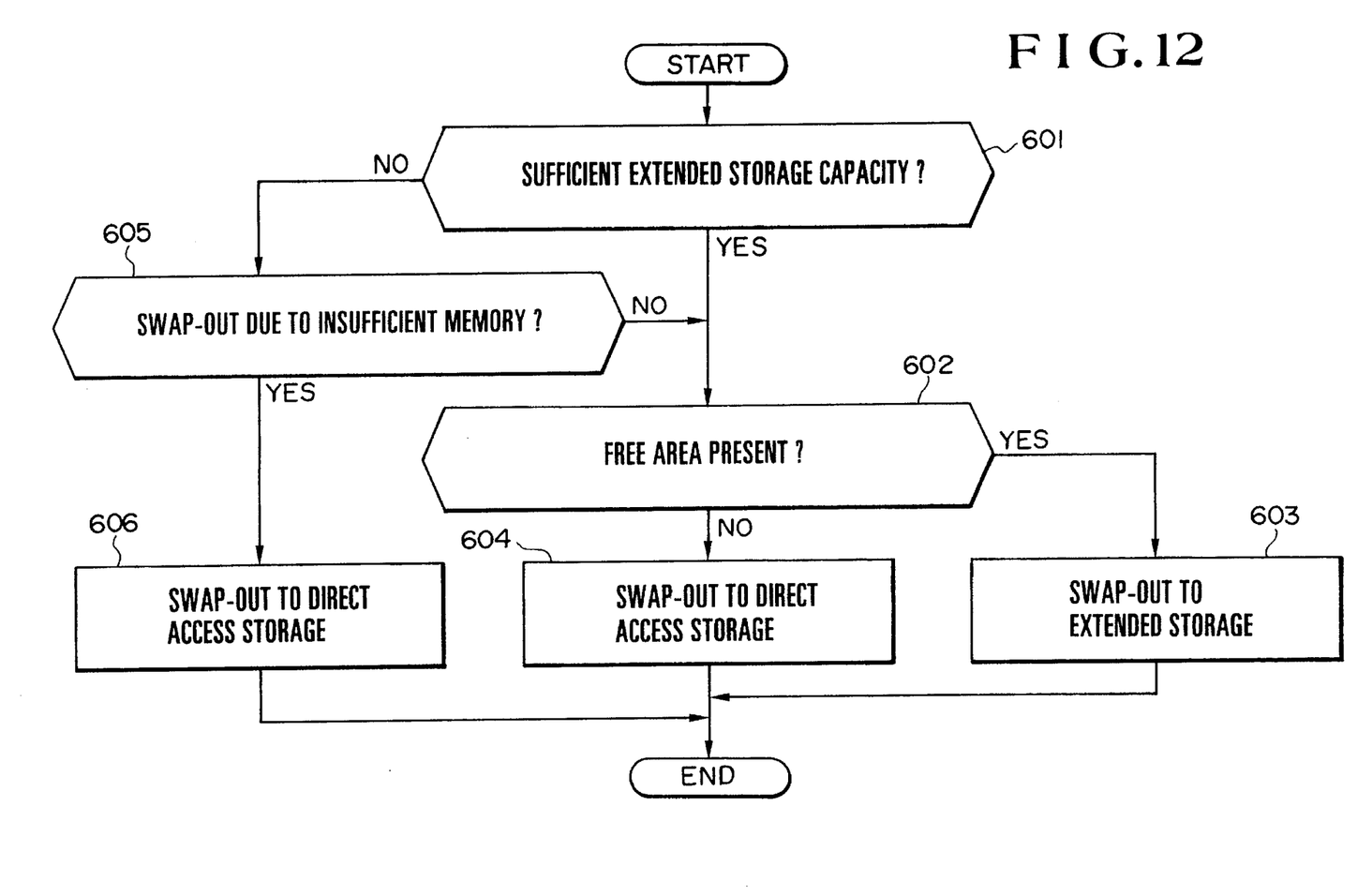
FIG. 12 is a flowchart showing an example of a processing procedure of a swap control.

Finally, the swap processing 113 will be described. FIG. 12 shows a flowchart of the swap processing 113.

When the resource centralized manager detects events such as a phenomenon of insufficient free areas in the main storage 101, the processing 113 is initiated by the manager. In response thereto, the processing 113 checks to decide whether or not the available capacity of the extended storage 102 is sufficient for the system operation (step 603). If the capacity is sufficient and a satisfactory period of time is reserved for a migration of the data undergone the swap-out operation, almost all data items undergone the swap-out operation due to the insufficient memory can be expectedly subjected to the swap-in operation prior to the migration thereof. Consequently, in this case, it is considered that the data items undergo the swap-out operation to the extended storage 102 regardless of causes of the swap-out operation. The swap processing 113 checks to determine whether or not there exists a free area sufficient for the swap-out operation to the extended storage 102 (step 602). If a sufficient free area is present, the data is subjected to the swap-out operation to be transferred to the extended storage 113 (step 603). Otherwise, the data is transferred to the direct access storage device 103 by the swap-out operation (step 604).

On the other hand, if the capacity of the extended storage 102 is insufficient in the step 601, a check is made to decide the cause of the swap-out operation (step 605). If the operation is due to an insufficient memory capacity, the swap-out operation is conducted to transfer data to the storage 103 (step 606). If the operation is caused by another cause such as a wait for a terminal input, control is passed to the step 604. If the extended storage 102 has a free area, the swap-out operation is achieved to transfer data to the extended storage 102. In this connection, the causes of the swap-out operation are transferred at initiation of the swap processing 113 as parameters from the resource centralized manager to the processing 113.

In the step 601, whether or not the extended storage capacity is sufficient is decided according to the following standards. If the mean time from when data undergone a swap-out operation due to an insufficient memory capacity to when the data is subjected to a swap-in operation is less than the time from when the data is transferred to the extended storage 102 to when the data undergoes the migration, the data is expectedly subjected to a swap-in operation from the storage 102. On the other hand, the period of time from when the data undergone a swap-out operation is outputted to the extended storage 102 to when the data undergoes the migration can be approximated as "extended storage capacity/page-out frequency". In consequence, as a result of measurement of the mean time from when data is subjected to a swap-out operation due to an insufficient memory capacity to when the data undergoes a swap-in operation and the frequency of page-out operations to the extended storage 102, if the capacity of the extended storage 102 is greater than a value resultant from a computation of "the mean time*mean page-out frequency", it is assumed that the data expectedly undergoes a swap-in operation from the extended storage 102. According to this standard, the swap-out processing 113 decides whether or not the capacity of the extended storage 102 is sufficient. As above, according to the control of the swap-out processing, when the capacity of the storage 102 is small, the extended storage 102 can be effectively utilized for other data.

According to the embodiment described above, in a case where the load is abruptly changed in the system, the high-speed external storage is efficiently utilized so that there are afforded a sufficient free space of the high-speed external storage without increasing the capacity thereof. Moreover, the number of transfers from the low-speed external storage can be decreased. Consequently, it is possible to improve the processing efficiency of the computer system operation with the virtual storage system.

While particular embodiments of the invention have been shown and described, it will be obvious to those skilled in the art that various changes and modifications may be made without departing from the present invention in its broader aspects.

We claim:

1. A storage control method for use in a computer system having a main storage, a first external storage, and a second external storage having an access speed higher than an access speed of the first external storage, the method comprising the steps of:
   (a) determining a size of a free area of the second external storage;
   (b) comparing the free area size with a predetermined first reference value;
   (c) when the free area size is determined in step (b) to be smaller than the first reference value, transferring storage contents of the second external storage to the first external storage such that the free area of the second external storage has a size not less than the first reference value;
   (d) when the free area size of the second external storage is determined to be larger than the first reference value, comparing the free area size of the second external storage with a predetermined second reference value larger than the first reference value; and
   (e) when the free area size of the second external storage is determined in step (d) to be smaller than the second reference value, transferring an amount of the storage contents of the second external storage to the first external storage, the amount being determined such that the transferring operation does not cause delays on current input/output operations of data files.

2. The method according to claim 1, wherein the transferred amount of the storage contents of the second external storage is further varied according to the free area size.

3. The method according to claim 1, wherein the step of determining the free area size is activated at least after the contents of a virtual storage are transferred from the main storage to the second external storage.

4. The method according to claim 1, wherein the step of transferring the amount of the storage contents of the second external storage is conducted at least at a predetermined constant interval of time.

5. The method according to claim 1, wherein the step of transferring the amount of the storage contents of the second external storage selects an area of the second external storage as an object of the transfer from reusable areas thereof.

6. A virtual storage control unit for use in a computer system having a main storage, a first external storage, and a second external storage having an access speed higher than an access speed of the first external storage, for controlling data of a virtual storage space kept by the main storage and the first and second external storages, comprising:
   first transfer means for transferring data from the main storage to the second external storage;
   second transfer means for transferring data from the second external storage to the first external storage, when a size of a free area of the second external storage becomes less than a predetermined first reference value, thereby setting the free area size of the second external storage to be not less than the first reference value; and third transfer means for transferring an amount of data from the second external storage to the first external storage at a predetermined interval of time, when the free area size of the second external storage is equal to or more than the predetermined first reference value and is less than a predetermined second reference value larger than the first reference value, the amount being determined such that the transferring operation does not cause delays on current input/output operations of data files.

7. The unit according to claim 6, wherein the third transfer means includes transfer rate control means for changing, in accordance with the free area size of the second external storage, an amount of data to be transferred from the second external storage to the first external storage.

8. The unit according to claim 6, wherein the second external storage includes a semiconductor storage which can be accessed by a particular instruction.

9. The unit according to claim 6, wherein the first external storage includes a random access storage device.

10. The unit according to claim 6, further including:

an address translation table for keeping therein information indicating, for each area of the virtual storage space, space assignment thereof to one of the areas of one of the main storage, the second external storage, and the first external storage; and a storage management table for keeping therein, for each area of the second external storage, assignment information indicating assignment thereof to either one of the areas of the virtual storage space and a page reclaimable flag indicating whether the area of the second external storage is reusable.

11. The unit according to claim 10, wherein the third transfer means includes transfer page selecting means for referencing the page reclaimable flag and thereby selecting from the areas of the second external storage a reusable area in use, the third transfer means transferring to the first external storage means data of the area selected the transfer page selecting means.

12. The unit according to claim 10, wherein the first transfer means determines, when transferring data from the main storage to the second external storage, whether allocation information being kept in the address translation table for a virtual space area to undergo the transfer with respect to an area of the second external storage is lost after the virtual space area is transferred from the second external storage to the first external storage by the second or third transfer means, the first transfer means setting the page reclaimable flag when it is determined that the information is kept remained in the table.

13. The unit according to claim 10, wherein the storage management table includes:

means for constituting an in-use queue concatenating entries corresponding to areas being used in the second external storage; and means for constituting an available queue concatenating entries corresponding to areas available for allocation of areas of the virtual storage space.

14. The unit according to claim 13, wherein the first transfer means connects to a last position of the in-use queue an entry of the storage management table associated with the area of the second external storage to which data is transferred from the main storage.

15. The unit according to claim 13, wherein the second transfer means sequentially selects an area of the second external storage as an object of transfer beginning from an area corresponding to a first entry of the in-use queue.

16. The unit according to claim 15, wherein the second transfer means references the page reclaimable flag and thereby decides whether the area of the second external storage transferred to the first external storage is reusable, the second transfer means connecting an entry of the storage management table corresponding to the area to a last position of the available queue when the area is reusable, the second transfer means connecting an entry of the storage management table corresponding to the area to a first position of the available queue when the area is not reusable.

17. The unit according to claim 16, wherein the third transfer means connects to a last position of the available queue an entry of the storage management table associated with the area of the second external storage transferred to the first external storage.

18. The unit according to claim 17, further including:

fourth transfer means for transferring data from the first and second external storages to the main storage; and pointer means for indicating, among the entries of the storage management table connected to the available queue, a first one of reusable entries of the second external storage, wherein the fourth transfer means, after transferring data from the second external storage to the main storage, connects an entry of the storage management table corresponding to the transferred area of the second external storage to a position of the available queue before an entry indicated by the pointer means.

19. The unit according to claim 17, wherein the fourth transfer means checks, when data to be transferred to the main storage is missing in an area of the second external storage corresponding to an entry of the storage management table connected to the in-use queue, the available queue to determine whether or not the data to be transferred is kept remained in either one of the areas of the second external storage associated with an entry of the storage management table indicated by the pointer means and entries subsequent thereto, the fourth transfer means transferring, when the data to be transferred is kept remained therein, the data to the main storage.

20. The unit according to claim 6, for controlling data items of a plurality of virtual storage spaces kept by the main storage and the first and second external storage, and further comprising means for allocating an area of the second external storage keeping contents of an area of a virtual storage space transferred to the main storage to an area of another virtual storage space in preference to an area of the second external storage keeping contents of an area of a virtual storage space transferred from the second external storage to the first external storage.

21. A virtual storage control method in which data items of a plurality of virtual storage spaces to be used by a processor are allocated to one of a main storage, a first external storage, and a second external storage having an access speed higher than an access speed of the first external storage, comprising the steps of:

(a) determining whether there exists a condition for a swap-out operation for transferring data of at least one of the virtual storage spaces of the main storage to one of the first and second external storages;

(b) when the condition exists, determining whether the second external storage has a sufficient capacity for the data of at least one of the virtual storage spaces of the main storage;

(c) when it is determined in step (b) that the second external storage has insufficient capacity, determining whether the existence of the condition for the swap-out operation is caused by an insufficient area of the main storage;

(d) when the existence of the condition for the swap-out operation is caused by an insufficient area of the main storage, transferring the data from at least one of the virtual storage spaces to the first external storage; and (e) when the existence of the condition for the swap-out operation is caused by other than insufficient area of the main storage, transferring the data from at least one of the virtual spaces to the second external storage.

22. The method according to claim 21, wherein the cause other than an insufficient area of the main storage is a wait for a terminal input or output operation.

* * * * *